United States Patent [19]

Boyd

[11] Patent Number: 5,263,289
[45] Date of Patent: Nov. 23, 1993

[54] MODULAR HOLLOW FLOOR PANELS WITH INTEGRAL DUCTING

[75] Inventor: Michael D. Boyd, Reid, Australia

[73] Assignee: Cablescape Access Flooring Pty. Limited, Canberra, Australia

[21] Appl. No.: 863,377

[22] Filed: Apr. 3, 1992

Related U.S. Application Data

[63] Continuation of Ser. No. 347,889, May 23, 1989, filed as PCT/AU87/00356, Oct. 22, 1987, abandoned.

[30] Foreign Application Priority Data

Oct. 22, 1986 [AU] Australia .................. PH8622

[51] Int. Cl.⁵ .................................................. E04B 5/48
[52] U.S. Cl. .................................. 52/220.2; 52/220.3; 52/220.5
[58] Field of Search ............... 52/220, 221, 302, 303, 52/126.2, 607, 505

[56] References Cited

U.S. PATENT DOCUMENTS

| | | |
|---|---|---|
| 2,056,069 | 9/1936 | McCoy ........................ 52/607 |
| 3,479,779 | 11/1969 | Ziegler . |
| 3,815,304 | 7/1974 | Schille ........................ 52/221 X |
| 3,886,702 | 6/1975 | Fork . |
| 4,499,332 | 2/1985 | Shea et al. . |
| 4,554,771 | 11/1985 | Mar et al. . |
| 4,566,235 | 1/1986 | Groll . |
| 4,682,453 | 7/1987 | Holmgren ..................... 52/126.2 |

FOREIGN PATENT DOCUMENTS

| | | |
|---|---|---|
| 43262/79 | 8/1979 | Australia . |
| 39227/85 | 2/1985 | Australia . |
| 43345/85 | 1/1986 | Australia . |
| 77989/87 | 12/1987 | Australia . |
| 94780 | 11/1986 | European Pat. Off. . |
| 8601244 | 2/1986 | PCT Int'l Appl. ............... 52/503 |
| 787567 | 12/1957 | United Kingdom . |
| 2175936 | 12/1985 | United Kingdom ............. 52/221 |

OTHER PUBLICATIONS

Advertisement–Tapflex–B.C.M.E. (Building Construction Materials & Equipment) Jun./Jul. 1986, vol. 28 No. 6, No. 167 ISSN 08110670, p. 37 and reader enquiry A21.

*Primary Examiner*—Michael Safavi
*Attorney, Agent, or Firm*—Nikaido, Marmelstein, Murray & Oram

[57] ABSTRACT

A modular panel, which in use is laid in a continuous two-dimensional array over a supporting sub-surface to form a hollow floor, wall or ceiling suitable for reticulating electrical, optic-fibre, hydraulic and other conduit. The panel having upper and lower duct zones each partitioned by lateral ribs and longitudinal ribs respectively. The upper duct zone being in communication with the lower duct zone by way of vertical duct sets.

7 Claims, 10 Drawing Sheets

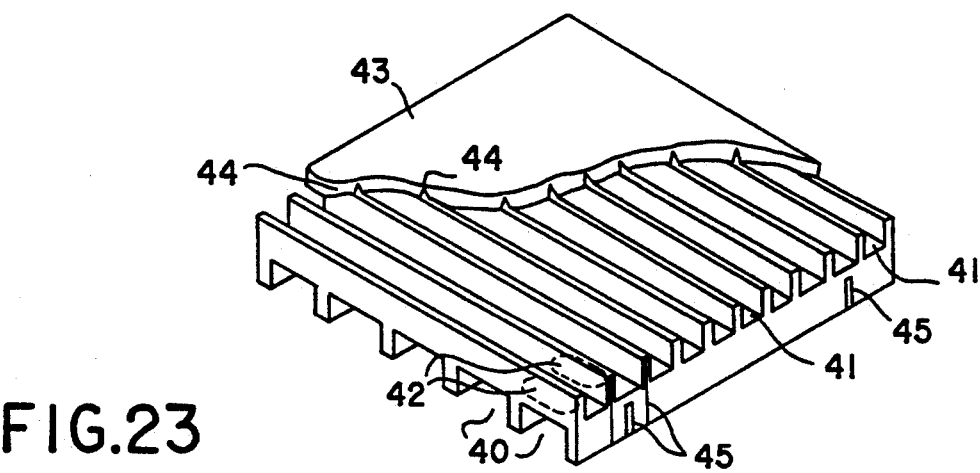
FIG.23
FIG.24
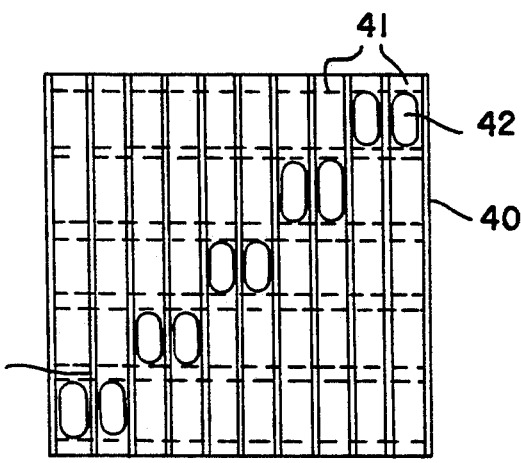
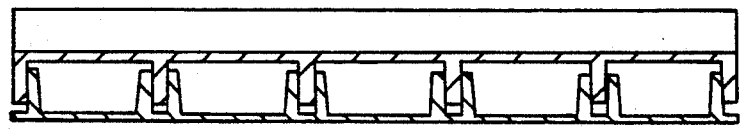
FIG.25

MODULAR HOLLOW FLOOR PANELS WITH INTEGRAL DUCTING

This application is a continuation of application Ser. No. 07/347,889 filed May 23, 1989 filed as PCT/AU87/00356, Oct. 22, 1987, now abandoned.

INTRODUCTION

This specification describes a modular, hollow floor panel which when laid over a structural sub-floor, allows reticulation of electrical and communications cabling, without significantly increasing the height of the finished floor level.

It has a major application in automated office buildings, where the extensive use of computing and communications equipment has created a need to locate cabling throughout open office areas, and it is an alternative to the raised "access flooring" used in computer areas which has a depth of several hundred millimeters.

PRIOR ART

In current building practice the problem of within-the-floor cable access to points on an open-plan floor Is solved by one of three methods:

1 in-floor ducted grids, which are typically cast into the floor slab, and consist of one-channel, two-channel or three-channel duct grids linked by cross-over boxes, and which have outlets provided at regular intervals. Australian patent no. 521,913 is an example of such a system. The ducts must be relatively widely spaced, and so the floor has limited cable-carrying capacity.

2 cellular floors, which utilise hollow cells built into the floor slab. The cells are fitted with outlet boxes at regular intervals and cables are fed along the cells (or "raceways") from a "header trench" which sits flush with the floor and is typically located along a wall or a corridor. Examples are Australian patent no. 410,965 and U.S. Pat. No. 2,445,197.

These systems have a greater flexibility in the location of outlets, but cable access between two adjacent points along the floor is only possible by routing the cable up one cell, along the header trench, and down the adjacent cell. Recent developments have included the system described in Australian specifications 48,697/85 and 32,227/85. (Specification 48,697/85 describes a header-trench module and specification 32,227/85 describes a cellular raceway module.) This is a low-height floor laid onto the structural slab, but is generically a cellular floor of the type described above, and suffers from the same disadvantages.

3 raised access floors, which conventionally consist of 600 mm ×600 mm deck panels supported at each corner on adjustable-height pedestals. An example is Australian patent 462,745. Such floors provide optimum accessibility and cable capacity, but are expensive, and create difficulties because of their height. They also require some form of cable guides to maintain order and to segregate power, telephone and data services.

DESCRIPTION OF THE INVENTION

The purpose of this invention is to provide a low-height access floor which will allow both lateral and longitudinal cable access to any point on the floor, and which has integral ducting which will provide continuous structural support to the deck, and a means of segregating services, and a means for creating orderly cable layouts.

Whereas the primary application of the invention is to floors in buildings (and the descriptions herein assume this), it should be understood that there are some situations where the system can be used on walls or cellings (for example in sound studios) and so the invention is not limited to floor applications.

The invention is now described with reference to the drawings, in which:

FIG. 23 shows an isometric view of a panel with two sets of ducts, each perpendicular, and located one above the other;

FIG. 24 shows a plan-view of the construction shown in FIG. 23;

FIG. 25 shows a cross-section through a levelling tray which can be used in conjunction with panels of the type shown in FIGS. 23 and 24;

Figure 1:
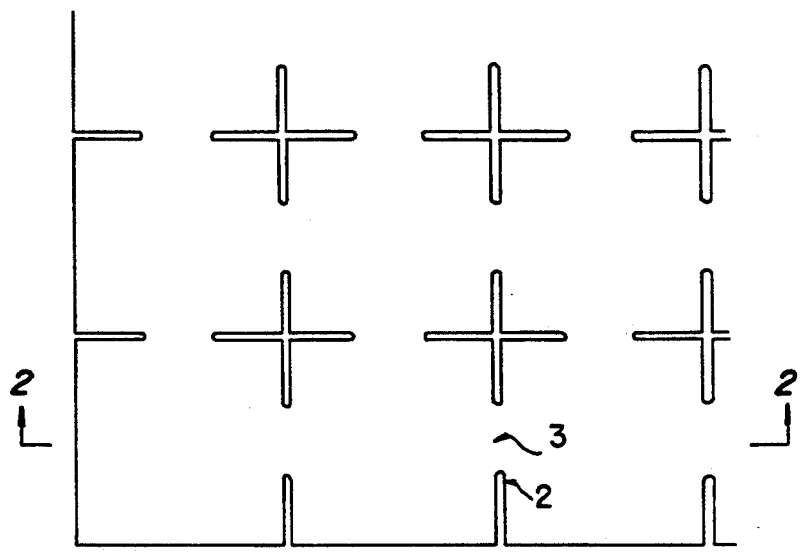
FIG. 1 is a plan view of one corner of a segmented panel which has a single-level cavity for the purpose of carrying services conduits.
Figure 2:
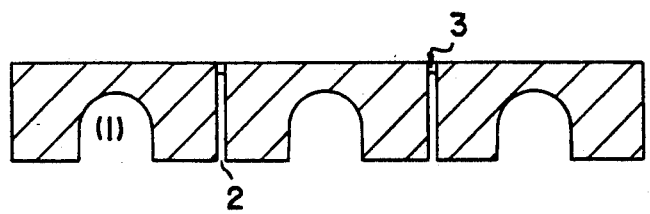
FIG. 2 shows a section A—A through FIG. 1.

The panel can take a number of forms. The first type of construction is illustrated in FIGS. 1, 2 and 3, in which:

FIG. 1 is a top view of a corner of the panel,

FIG. 2 is a cross-section of the panel at line A—A, and

Figure 3:
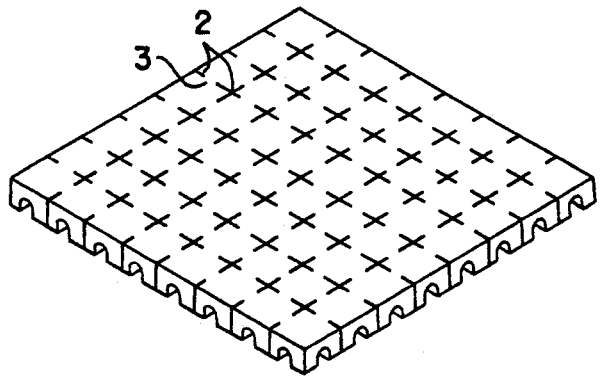
FIG. 3 is an isometric view of the panel shown in FIGS. 1 and 2.

FIG. 3 is an isometric projection of the panel.

This panel has a flat upper surface, and the underside is criss-crossed with a series of "vaults" (1) which define channels through which the cabling may be laid. The channels occur in at least two directions: a first set of channels runs laterally from one side of the panel to the other, and a second set of channels runs longitudinally from one end of the panel to the other. Diagonal and vertical channels are also possible, and formations with these features will be described later. Between the said vaults, there are slits (2) which divide the panel into an array of rigid sub-elements in the form of pedestals, which are inter-connected by small cross-sections of material (3). This allows the panel to flex and to accommodate undulations in the surface of the structural sub-floor. The inter-connections are shown as occurring on the upper surface of the panel, but they may occur on the lower surface of the panel (see FIG. 5) or at any point on the sides of the pedestal sub-elements.

The vault size depends on the size of cable or conduit to be accommodated, but is limited by the rigidity of the bridge over the vault. In general a rigid construction material will allow wider vault spans and thinner bridge thickness (and hence thinner panel thickness) but an Inelastic construction material is more susceptible to brittle fracture, noise transfer, and rocking on an uneven sub-floor surface.

Figure 4:
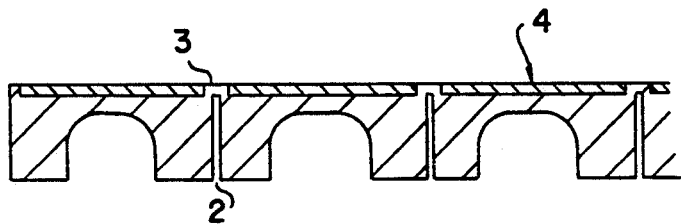
FIGS. 4 and 5 show alternative cross-sections A—A in which the panel is of composite construction.

FIG. 4 illustrates a variation in which a rigid plate (4) is incorporated in the upper surface of each sub-element. The purpose of this is to increase the load-bearing capacity of the sub-element, and is applicable to panels formed from a semi-rigid base material such as a rubber compound. The plate is illustrated as being flat, but it may be ribbed, folded or curved to increase its structural rigidity and to improve the key to the base material. It may also be provided with one or more holes to facilitate the passage of cables through the surface of the panel.

Figure 5:
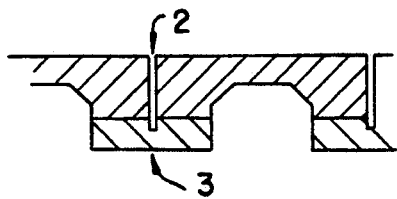

As an extension of the concept illustrated in FIG. 4, the upper body of the panel may be constructed from a strong and inelastic material, and the lower portion of the legs constructed from a flexible material, thus providing the panel with a flexible base. This is illustrated in FIG. 5. In this construction the panel may be divided into rigid sub-elements as before, but the inter-connections between the segments may be provided within the flexible base material.

The second type of construction is illustrated in FIGS. 6, 7, 8 and 9.

This second type of construction differs from the first in that additional slits (5) are provided which divide the panel into triangular sub-elements (6). Triangular sub-elements have the advantage of accommodating to an uneven sub-surface, and this type of construction is applicable to the use of rigid materials such as pressed steel, cast aluminium, or rigid plastics.

Figure 6:
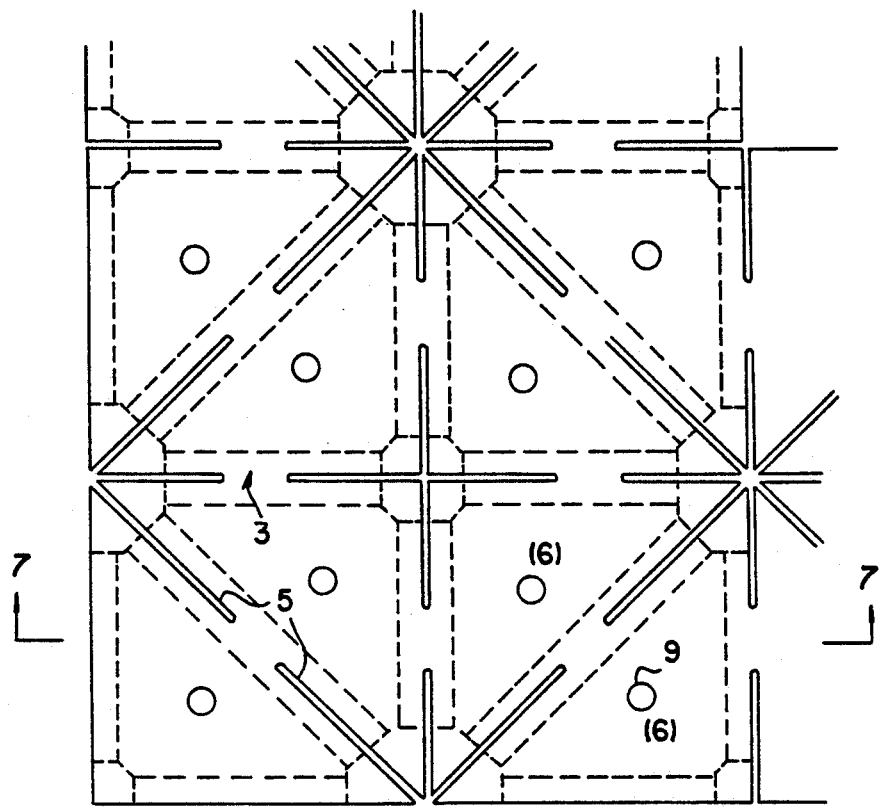
FIG. 6 is a plan view of one corner of a segmented panel which has a single-level cavity for the purpose of carrying services conduits, similar to the construction shown in FIG. 1, but assembled-from triangular segments.
Figure 7:
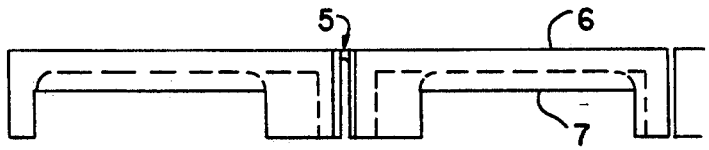
FIG. 7 shows a section B—B through FIG. 6.
Figure 8:
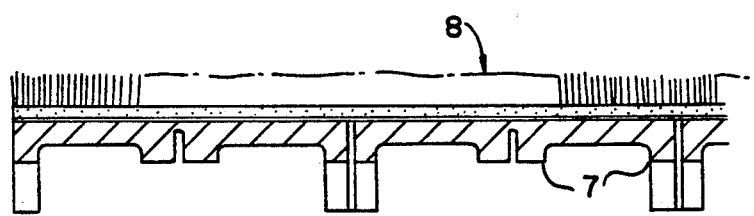
FIG. 8 shows an alternative cross-section B—B with a floor finish in place.
Figure 9:
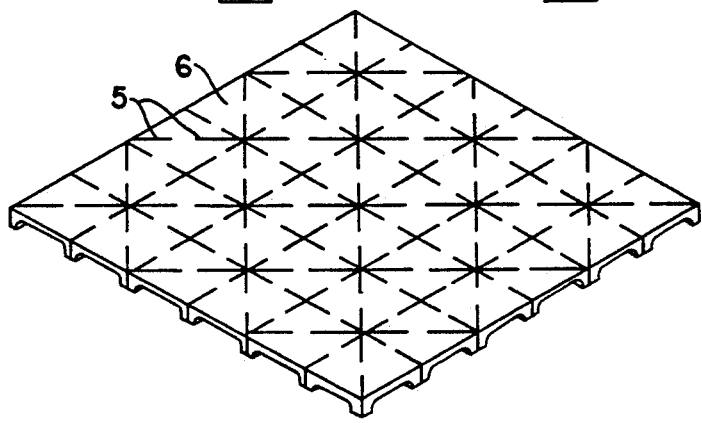
FIG. 9 is an isometric view of the panel shown in FIGS. 6, 7 and 8.
Figure 10:
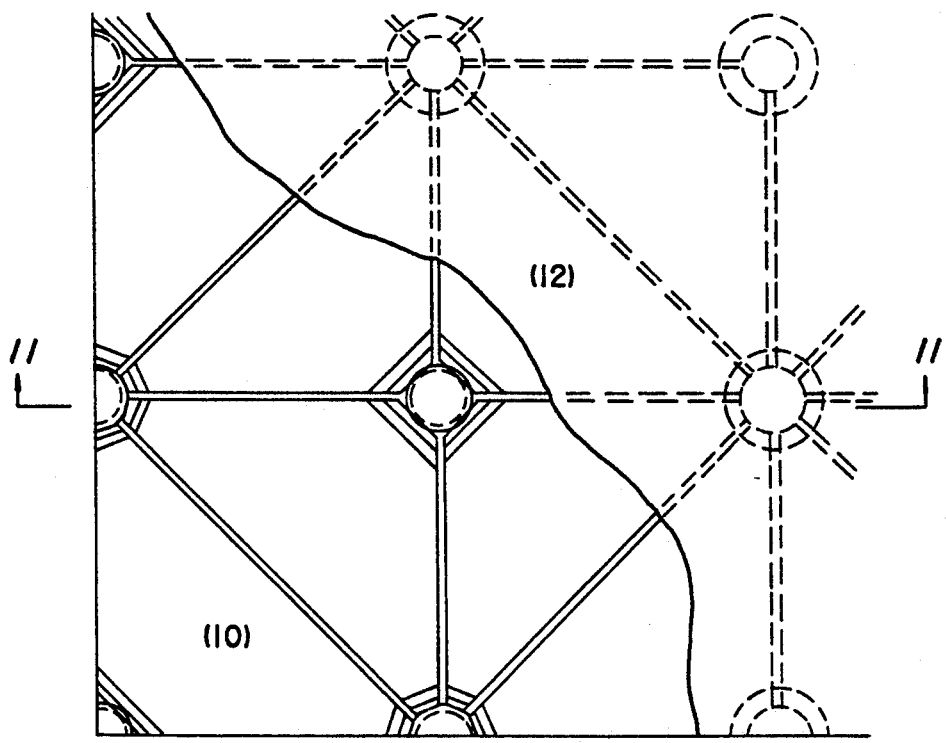
FIG. 10 is a plan view of one corner of a segmented panel which has triangular deck segments supported on a moulded base.

FIGS. 6 to 8 indicate construction from a cast or moulded material such as aluminium or rigid plastic, in which each triangular sub-element (6) has stiffening ribs (7) along its deck edges. As with other constructions the panel surface (or deck) may be provided with cable transit holes (9).

The panel construction illustrated in FIG. 8 has the floor finish (8) (in this case carpet) integral with the panel. As the floor finishing element is continuous, it can be utilised to inter-connect the panel sub-elements, and so in this case the previously described panel inter-connections (3) are not mandatory.

It is possible to form this type of panel in the manner shown in FIG. 4, in which the panel is constructed from a resilient material, and has rigid stiffening plates incorporated in the upper surface of each triangular sub-element. It is also possible to form the panel in the manner of FIG. 5 in which deck segments constructed from rigid material are provided with flexible feet.

A third type of construction is illustrated in FIGS. 10, 11, 12 and 13.

This panel construction comprises a lower section (10) with pillars (11) which locate and support a removable upper section (12). The lower section maybe constructed from a rigid or a semi-rigid material such as injection-moulded plastic, and it may be segmented to allow it to adapt to undulations in the structural floor surface. The deck, which must be rigid across the spans between the pillars, may be continuous, or divided with flexible connections along the joints between each pillar (into for example square or triangular shapes), or it may consist of discrete sub-elements which may be individually removed or replaced.

Figure 11:
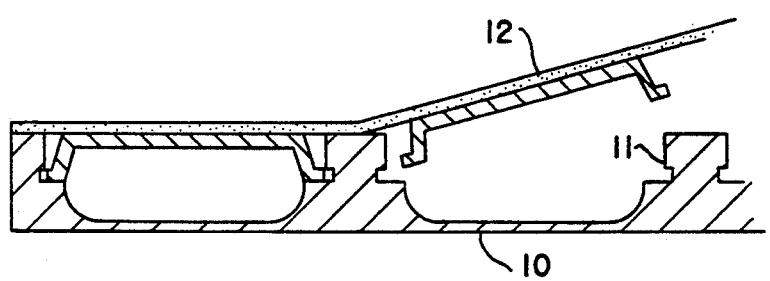
FIGS. 11, 12 and 13 show alternative cross-sections C—C through FIG. 10.

In the example shown in FIG. 11 the removable deck (12) is segmented into triangular sub-panels, each of which have clips which interlock with the pedestals (11). The deck segments are attached to a flexible membrane.

Figure 12:
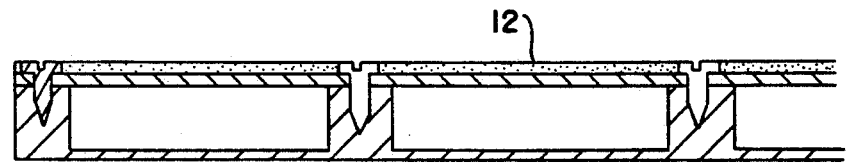

FIG. 12 illustrates a slightly different form of construction in which the upper surface (12) of the panel is pinned or screwed to the lower section of the panel.

Figure 13:
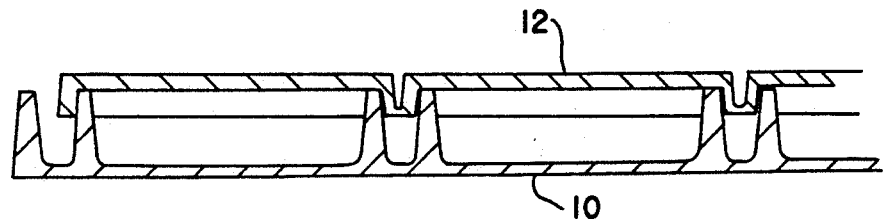

FIG. 13 shows an arrangement in which the deck segments are formed with down-turns at each corner which engage into the pillars, which are hollow.

It should be noted that FIGS. 11, 12 and 13 merely illustrate three examples by which the upper and lower sections of the panel may be connected to one another. In all of the constructions described in this specification the deck may be attached to the base with other devices such as keys, clips, adhesive or "velcro" strip; or the upper section may be loose-laid onto the lower section with optional horizontally engaging keys to prevent shear between the upper and lower sections.

Figure 14:
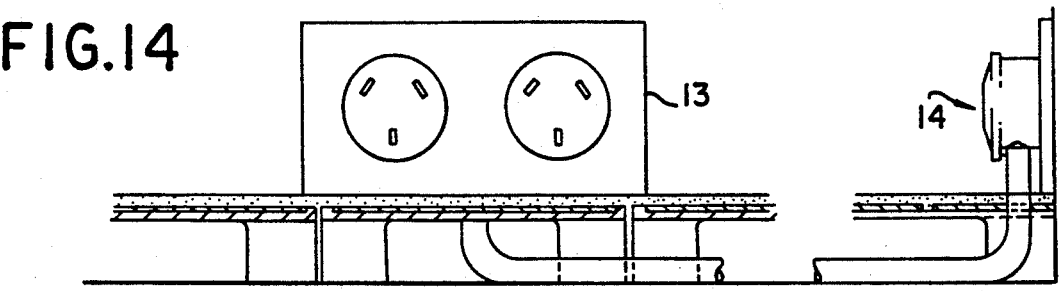
FIG. 14 shows a relocatable floor panel with a services outlet mounted on the deck.

In use, the panels are laid on a structural sub-floor, and cabling is reticulated within the vaults of the panels from service points on the building structure to the required location of the service outlet. At the required location of the service a fixed service point may be provided, for instance by coring through the panel deck to allow cable access, and attaching the outlet over the panel and fixing it through to the structural sub-floor. Alternatively the service outlet may be incorporated into the panel itself. FIG. 14 illustrates a panel which incorporates a service outlet (13) and a length of cable (14), which connects to a permanent service outlet. Such a panel may be located at some distance from the permanent service outlet, and can be attached permanently to the floor or it can be made removable, and this will allow it to be easily relocated.

Figure 15:
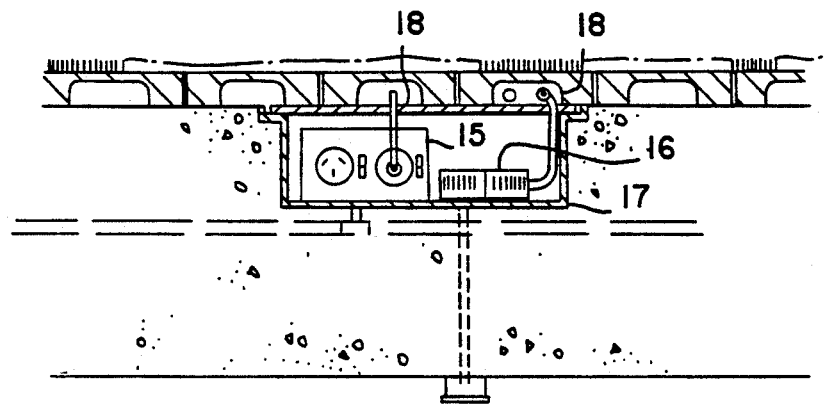
FIG. 15 shows a method by which the floor panel system can be intergrated with in-floor outlet boxes.

FIG. 15 illustrates a permanent services point which is located within the structural floor and which can be used in conjunction with the relocatable service panel illustrated in FIG. 14. In FIG. 15, the services connection points (15), (16) are located in a box (17) sunk into the structural floor. The box is provided with a rigid removable lid (17) which has cut-outs (18) at the edges to allow passage of the services cables from the panel vaults into the box itself.

In floor tiling systems of the type described previously it may be desirable to interlock the panels, in order to prevent vertical mis-alignment between adjacent panels, and to prevent incorrect orientation in the case of panels which have asymmetrical duct locations.

Figure 16:
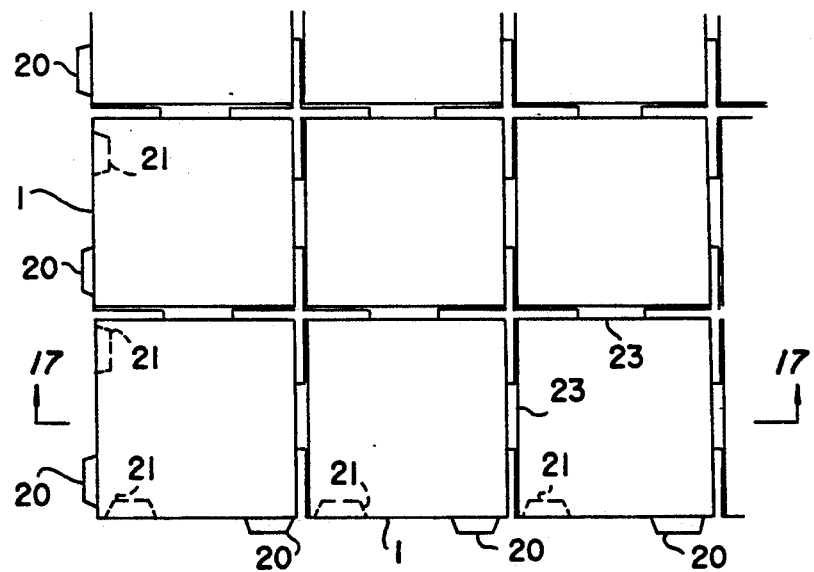
FIG. 16 shows a plan view of the corner of a panel with interlocking keys on the sides and two levels of cable cavities.
Figure 17:
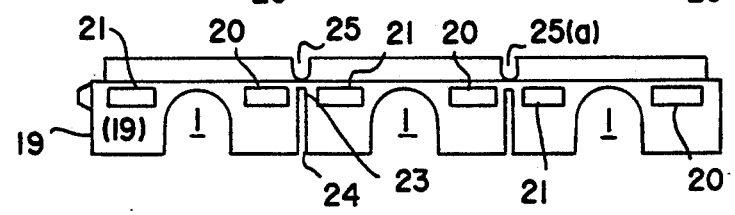
FIG. 17 shows a cross-section D—D through FIG. 16.

FIGS. 16 and 17 Illustrate one means of achieving interlocking between panels, in which the side faces of the panels (19) have incorporated on them convex dimples (20) alternated with concave dimples (21). The panels will interlock if on abutting faces each convex dimple aligns with a corresponding concave dimple.

Other forms of interlocking may be used to achieve this purpose, for example male-female connections of the form used to connect pieces in a jig-saw puzzle, or alternate snap-in plugs and sockets, or hooks which extend from alternate faces of each panel and engage In sockets formed in the body of the panel.

The interlocking devices can be designed so as to allow individual panels to be withdrawn from the body of the floor, for example by flexing of the panel to achieve a disengagement of the interlocking devices. Alternatively, in the case of panels with a detachable deck, the keys can be formed by offsetting the deck. The panel can in this case be removed by first disengaging the deck, and then extracting the base.

FIGS. 1 and 4 illustrated a panel which comprises rigid sub-elements joined by thin connections (3) which will allow the panel to flex along the lines of the slits (2). FIGS. 16 and 17 illustrate an arrangement in which in addition to the slits (24), small channels (25) may be formed in the upper surface of the panel, and this will create an alternative location for cabling. These channels should be narrow in cross-section to maximise the support to the overlying floor finish, but of sufficient size to allow the passage of small-diameter cable such as telephone wiring or optical fibre. This will allow these cables to be separated from cables underneath the panel by the body of the panel itself.

The upper channels (25) may also be provided with overhangs (25a) which will improve support to the floor finish and which will retain and protect any cabling in them.

Figure 18:
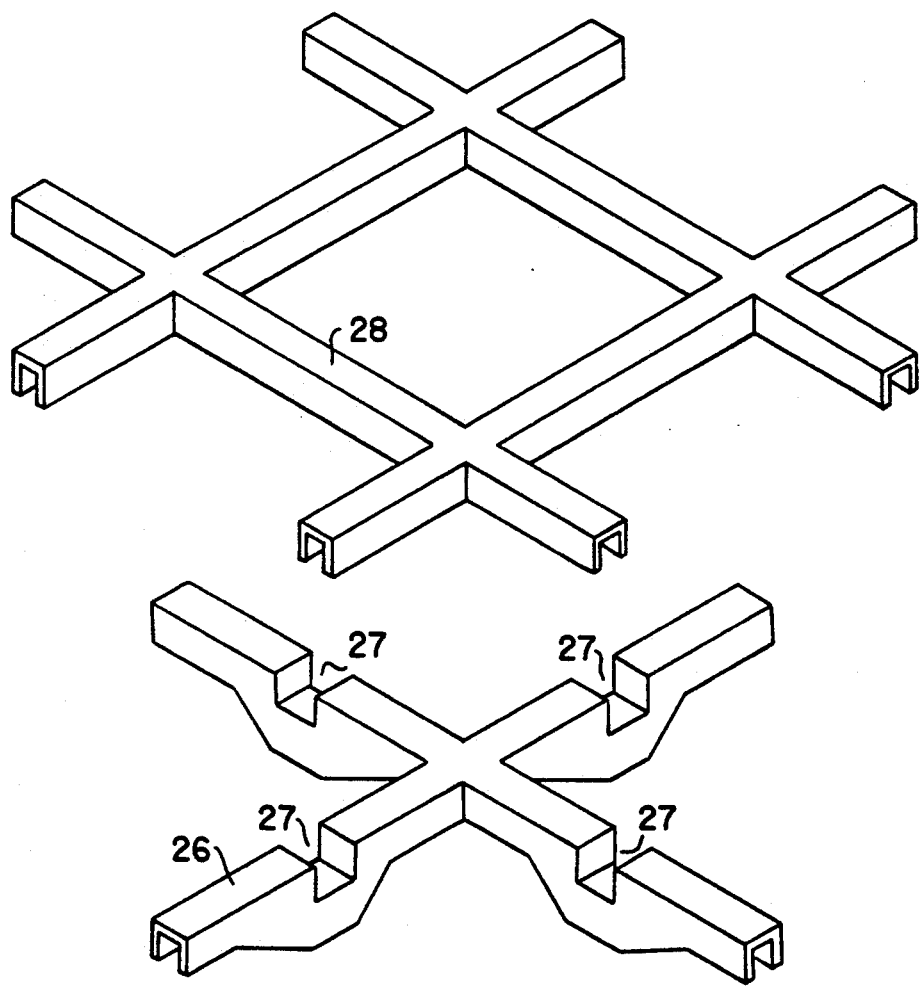
FIG. 18 shows an isometric view of cover strips to protect the upwardly opening channels of the panel shown in FIGS. 16 and 17.

Additionally the upper channels may be provided with cover strips to protect the cabling ana/or to support the overlying floor finish. FIG. 18 illustrates a segment of one possible cover-strip arrangement, which allows alternate cable troughs to carry different services, and which provides physical separation of each service.

In this arrangement, the lower cover (26)—which may for instance carry telephone cabling—has setdowns (27) to allow the separated passage of another cable network—for instance data—and which can be protected by an upper cover (28). Note that the setdowns (27) will require the channel (25) in the region of the channel intersections to be deeper than in the areas away from the intersection (in this case over the vaults).

Although FIG. 18 illustrates cover-stripping in a grid arrangement, it is of course possible to form the covers from simple extruded sections which can be cut to cover the cables as required. They may be "U" shaped in cross-section or they may for instance be flat (or slightly bowed) strips which engage in grooves or ledges on the sides of the channels.

The channels and the covers may be marked or coloured to distinguish the various cable networks that they are intended to contain.

Whilst FIG. 18 illustrates a two-channel cover system, the principle can be extended to create three or more separated channel networks. It is also possible to delete the vaults (1) and the slits (24), so that all the cable channels will be located on the upper side of the panel. Although this will require the use of larger channel widths and structurally rigid cover strips, the arrangement will remove the need for access to the underside of the panels, which may then be glued to the floor.

Figure 19:
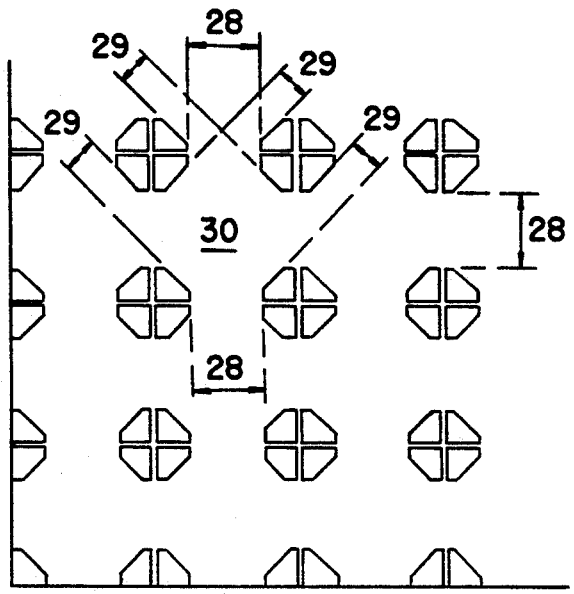
FIGS. 19 and 20 show plan views of panels which have diagonal cable channels in addition to orthogonal channels.

The panel may be provided with channels on the underside which are orthogonal to the sides of the panel, or diagonal to the sides of the panel, or both. FIG. 19 is a view of the underside of a panel with both orthogonal channels (28) and diagonal channels (29) which intersect in areas (30). Such a combination of channels allows cables to be reticulated in various directions, at 45° increments. It also permits cables to be turned about a larger radius of curvature than would be possible if there were no diagonal channels.

There is a trade-off involved in this arrangement however—as the span of the vaults is increased, the span over the intersection of the vaults (30) becomes quite large, and this necessitates the use of thicker cross-sections and more rigid materials in order to achieve the required rigidity of the flooring surface.

Figure 20:
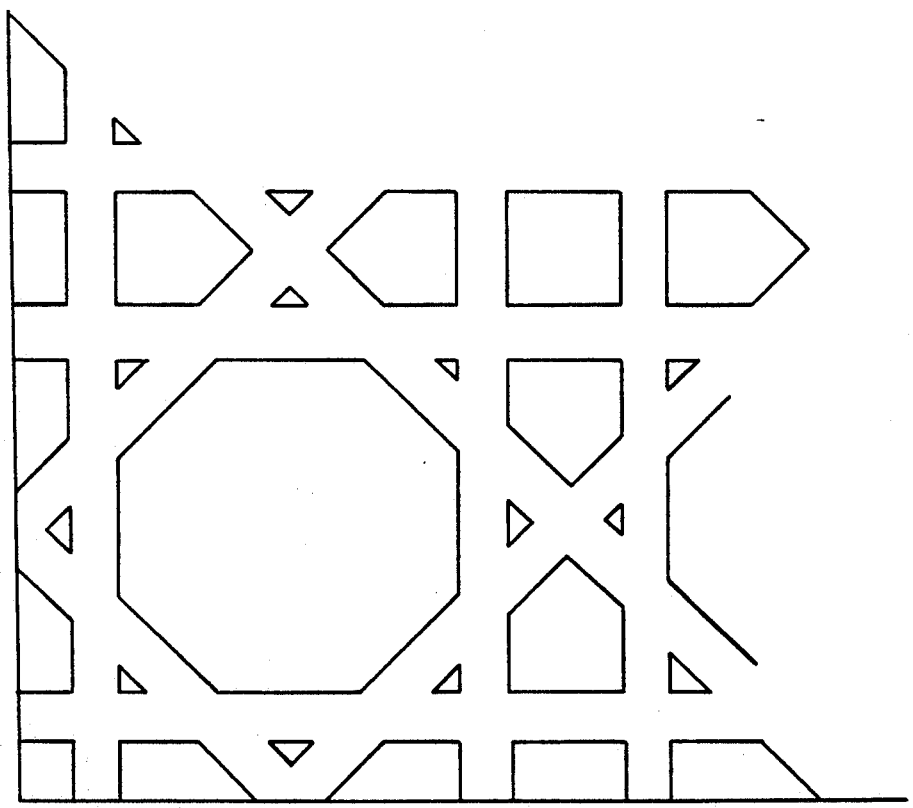

One means of reducing the arch spans is illustrated in FIG. 20, which is a plan view of a panel with an alternative vault configuration. In this arrangement the spacing between vaults has been increased, and both sets of vaults have been offset so that no more than two channels intersect at any one point. This decreases the maximum spans over the vault sections and thus allows the use of thinner panel cross-sections and softer material of manufacture. Note that in this arrangement the channels may be formed on either the underside of the panel or on the upper side.

Figure 21:
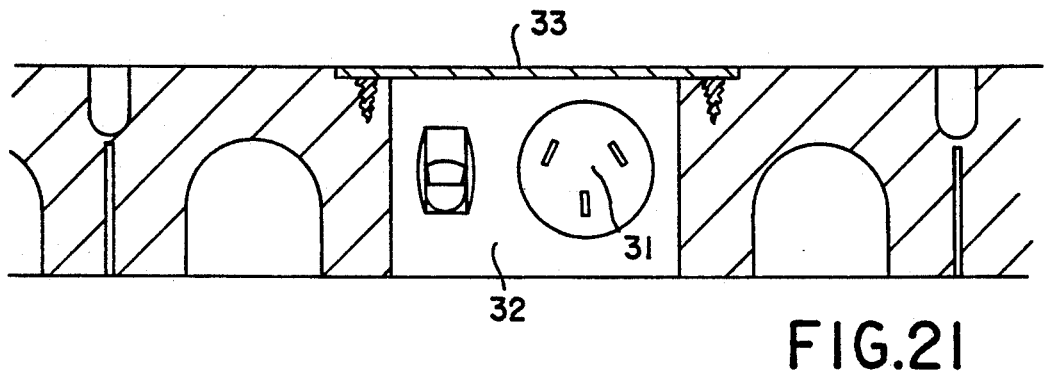
FIG. 21 shows a part section through a panel with a services outlet located beneath the deck surface.

A "service panel" was previously described (FIG. 12) which incorporates a services outlet and which can be located at any position on the floor. A variation to this should be noted in which the service outlets are located within the body of the panel. FIG. 21 is a section through part of such a panel, in which services outlets (31) are located in a cavity (32) which may be covered by a plate (33). With this and with the previously designed panel the extension leads may be permanently wired into the outlet,, or they may be detachable via plug connections. Considerations relating to these are described below.

Figure 22:
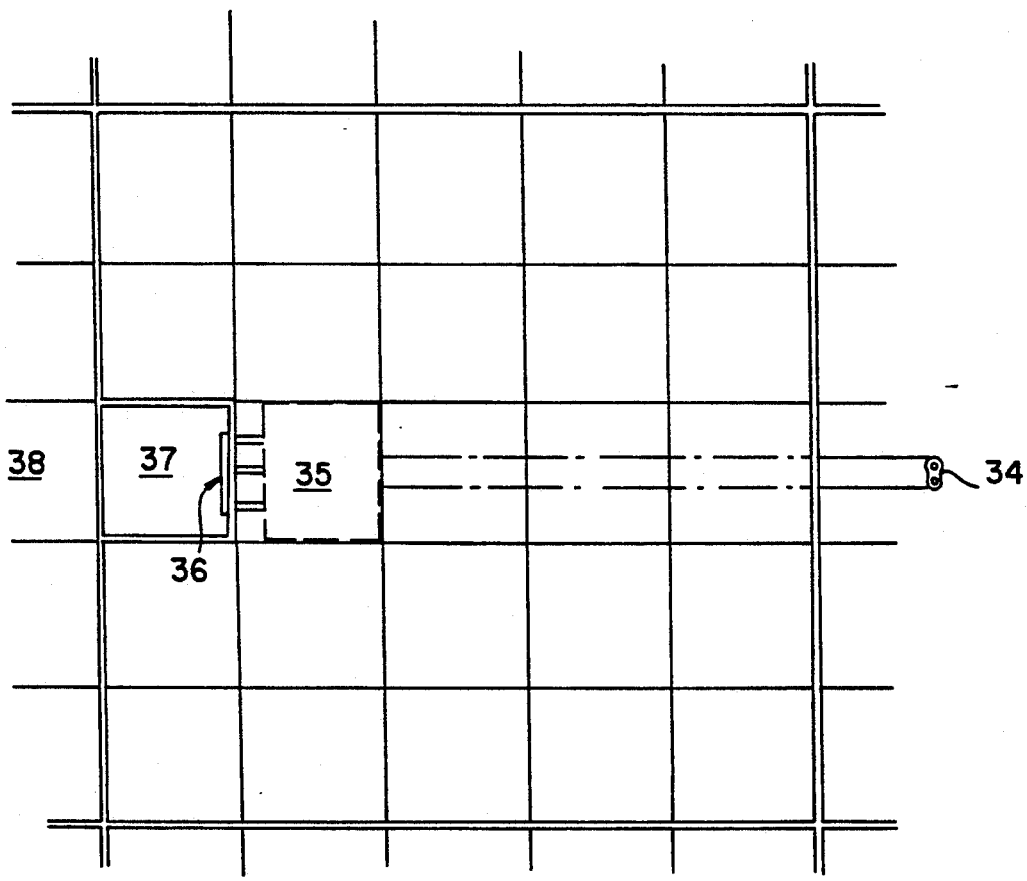
FIG. 22 shows a plan-view of the panel shown in FIG. 21.

A services panel may also be-designed to operate as a secondary terminal, to which services outlet panels can be connected. FIG. 22 is a plan view of such a secondary terminal panel, in which cabling (34) is brought into a junction box (35), and thence to a connector (36), for instance a female pin-connector. The junction box and connectors may be integral with the panel or separate from it, but it is preferable that they are contained within the thickness of the panel. Again with reference to FIG. 22, the secondary terminal panel may be provided with a cavity (37) in which plugs to the services outlet panel are located. A removable segment or a cover-plate may be used in or over this cavity when a services outlet panel is not connected.

In order to comply with wiring regulations it may be necessary to ensure that intermediate connections in the wiring such as the connection at the secondary terminal to the services outlet panel cannot be accidentally broken. Nevertheless it is desirable to use a removable plug as the means of connection, so that outlets may be relocated without requiring the assistance of an electrician.

One means of securing the plug against accidental disconnection is to make the connecting plug or plugs the same size as the plug cavity (37); thus the abutting panel (38) will prevent the plug from being withdrawn. Alternatively, the connecting plugs may be screwed to the junction box, or inserted in a vertical axis so that they will be restrained by the panel itself or by the flooring.

Both the secondary terminal panel and the services outlet panel may be provided with thermal detectors, overload detectors and/or circuit breakers.

A critical need of the various licencing authorities is that the various trunk cable networks within the floor-space are physically separated from each other. When the networks run only in one direction (for instance perpendicular to the walls) and are thus parallel to each other, separation can be achieved by physical spacing of the panels, or by providing solid barriers between vaults or groups of vaults, so that in effect the channels run in only one direction. Such a "tunnel-vault" panel could have a cross-section similar in principle to e.g. FIG. 2, but of extruded construction.

One means of allowing different cable networks to cross each other without passing through the same space is to provide the "tunnel-vault" panel described above with a second set of channels above the tunnel vaults, but at right-angles to them. FIGS. 23 (isometric projection) and 24 (plan view) show such a construction, which has lower channels (40) and perpendicular upper channels (41), which are connected by holes or knock-out panels (42). The holes or panels can be arranged so that each upper channel or group of channels can be uniquely linked to one or a group of lower channels.

In these illustrations there are shown two upper channels or ducts for every lower channel or duct. This arrangement has the advantage that the spans of the overlying deck are reduced, and it can be made thinner. A 2:1 ratio is not essential, however; a 1:1 or a 1:2 ratio may be equally satisfactory from the point of view of cable distribution.

This panel form can be constructed in a number of ways, for example by attaching two extrusions at right-angles, with permanent or removable connections. The panel shown in FIGS. 22 and 23 would be of injection-moulded construction, with a separate deck (43). This deck may be loose-laid or permanently attached or removably attached, and it may be attached over its full area or at the centre or for example along one edge. It may also incorporate the floor finish. In the case of a partially attached deck it may be provided with weakening grooves (44) over the supports or at right-angles to them which would enable it to flex upwards to provide access to the upper channels. The deck may also be fabricated with the upper channels (41) formed as vaults an its underside, so as to form two half-panels joined at the mid-line. This may allow the panels to be fabricated entirely from extruded sections.

The panel shown in FIG. 23 may be permanently or removably attached to the sub-floor. It is advantageous to glue it to the sub-floor around the centre of the panel, and in this case grooves (44), (45) may be provided through the walls of the lower vaults, to allow the panel to be curled upwards so as to allow access to the lower vaults from above.

Removable areas (46) may be provided In the walls of the channels in non-structural areas to permit the passage of cables from one channel to the adjacent channel, to improve flexibility and to permit larger radii of curvature from the upper channels to the lower channels.

In the case of a panel comprising a rigid deck and an injection-moulded base, it will be too rigid to adapt to undulations in the sub-floor. Small irregularities may be taken up by bedding the lower ribs in high-build adhesive (46), but in the case of a very uneven sub-floor it may be advantageous to seat the panels in levelling trays. Such an arrangement is shown in FIG. 25, which shows a panel (48) seated in a levelling tray (47). The ribs of the panel (49) are held between ribs (50) on the levelling tray, which provide support, and containment of levelling compound (51).

In all of the arrangements described In this document, the cabling may be introduced into the sub-flooring system in either of two ways—the cable may be laid along its intended route, in which case the cable route must be exposed by lifting the deck or lifting the panel itself so that the cable can be laid, or alternatively the cable may be fed along Its intended route, in which case the panel can remain undisturbed. The first method allows greater flexibility and the use of smaller and shallower cable channels, but the second method will minimise disruption to the room and the floor, and will allow the use of broadloom carpet rather than removable tiles.

The panel shown In FIG. 23 Is fairly simple in construction, but it is difficult to feed wires along the upper channels, because of the natural tendency of the wire to fall through the connecting hole into the lower channel.

Figure 26:
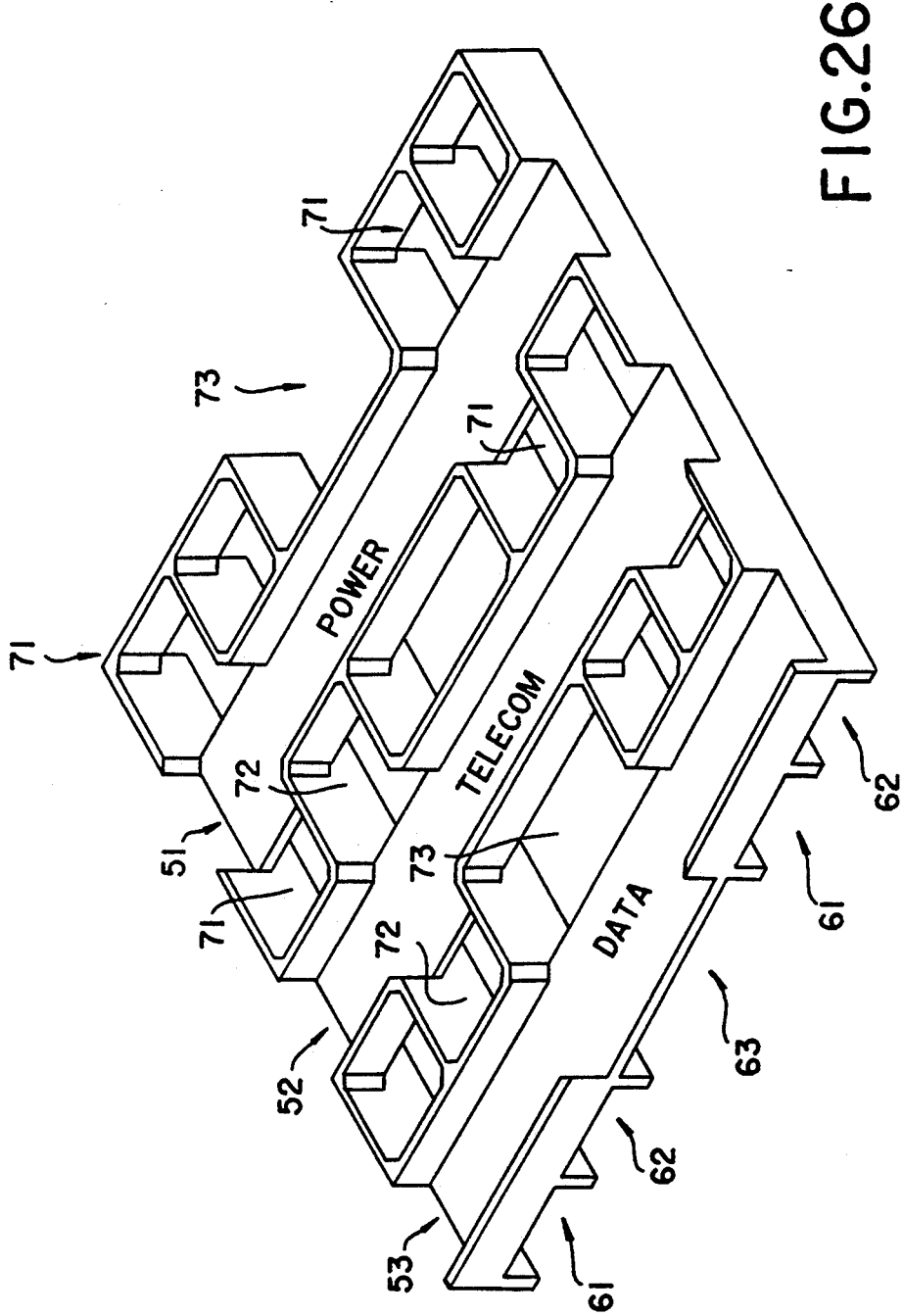
FIG. 26 shows an isometric view of a panel based which has a series of upper ducts with continuous troughs, which interconnect with ducts on the underside of the panel base via vertical ducts located on each side of the upper ducts.

An improvement on this basic principle is shown in FIG. 26, which shows a moulded panel base to be used in conjunction with a removable deck, and perhaps with a levelling tray as shown in FIG. 25.

In this arrangement, sets of ducts are provided along three axes at right-angles to each other. A lateral duct set 61, 62, 63 lies along the underside of the panel base, a longitudinal duct set 51, 52, 53 lies along the upper side of the panel base at right angles to the lower ducts, and the vertical duct set 71, 72, 73 extends from the lower duct set, on each side of the upper horizontal ducts. As shown in FIG. 26, each longitudinal duct 51, 52, 53 has an imperforate lower surface.

Each duct set is made up of a number of sub-sets; preferably three in number, to carry power, telephone and data services respectively.

Where a vertical duct abuts an upper horizontal duct of the same sub-set, an opening occurs between the two ducts (which may take the form of a knock-out panel); but where a vertical duct abuts an upper horizontal duct of a different sub-set, no opening occurs.

Thus each lower duct sub-set is connected to the corresponding upper duct sub-set via a vertical duct, and by such selective interconnections a series of physically separate duct networks are created.

In the example of FIG. 26 the upper duct (51) is dedicated to power cabling, and inter-connects with lower ducts of the same sub-set (61) via vertical ducts (71) to create a power conduit grid. Similarly, duct sub-sets 52, 62, 72 form a telephone conduit grid, and duct sub-sets 53, 63, 73 form a data conduit grid.

It will be seen that in addition to the major advantage of this arrangement that cables can be fed along the upper ducts with less risk of deflecting into the lower ducts, a number of further advantages accrue. Firstly, the arrangement provides regular access to each lower duct to enable control of cable feeding without the need to lift all or part of the panel. Secondly, the arrangement allows greater turning radii, of the order required for co-axial cables and optical fibre. Thirdly, the vertical ducts provide superior access to services outlets on the deck above the panel.

Although FIG. 26 shows three sets of ducts (for power, telephone and data), this number may of course be varied.

In addition, there may be several levels of horizontal ducts. Advantages can be gained by providing four layers of horizontal ducts, with the upper two layers having narrow and closely spaced ducts to reduce distances between possible services outlet points, and with the lower two layers having wide ducts to maximise cable carrying capacity and bending radii. Alternatively the panel may be constructed with a level dedicated to each service. This will remove the need for dividing ribs, and will permit cables to be run in any direction on their particular level, thus allowing shorter cable runs.

Figure 27:
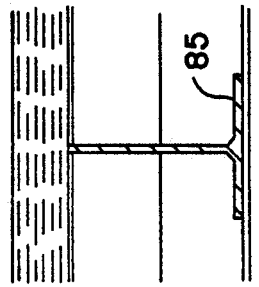
FIGS. 27 and 28 show details of two methods of connecting the deck to the base.

By utilising the sides of the panel base shown in FIG. 26, extending clips may be formed to attach the floor decking to the panel. FIG. 27 illustrates in detail the clips (80) which may be provided on the edges of the panel in FIG. 26. These clips can be disengaged from the decking panel to allow its temporary removal, and if they are asymmetrical on each side (e.g., of different heights or in different relative locations) the decking will be unable to be mis-oriented when it is replaced. This will allow the decking to have preformed outlets, or to be marked with the locations of the services ducts in the panel underneath, so that services can be accessed through drilled holes without the need to remove the panel.

Figure 28:
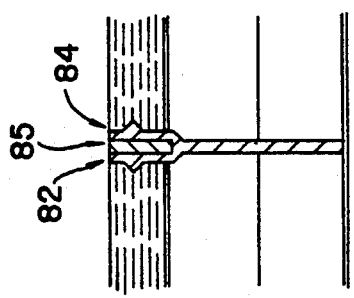

FIG. 28 shows an alternative method of attaching the deck to the base, in which the base has formed on It, hollow upstands (84) which when a peg or screw (83) is Inserted into them, expand against the deck (82).

Other forms of attachment are also possible, such as screw-fixing into the base, or variations of FIG. 28 in which the peg (83) is formed integral with the upstand (84), to create a form of "snap-lock".

Figure 29:
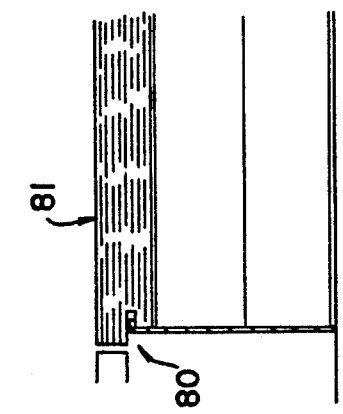
FIG. 29 shows a detail of one method of fixing the panel to the floor.

FIG. 29 shows a method of forming the base of the ribs so as to increase the surface area of the tile which bears onto the sub-floor, in which the rib has a foot (85). It should be noted that in constructions which have a foot or bearing pad, it is also possible to form thickened ribs, or double ribs which then connect to each side of the foot, rather than to the centre. These constructions have the advantage of creating column-like elements which are superior in transferring load from the deck to the sub-floor.

Figure 30:
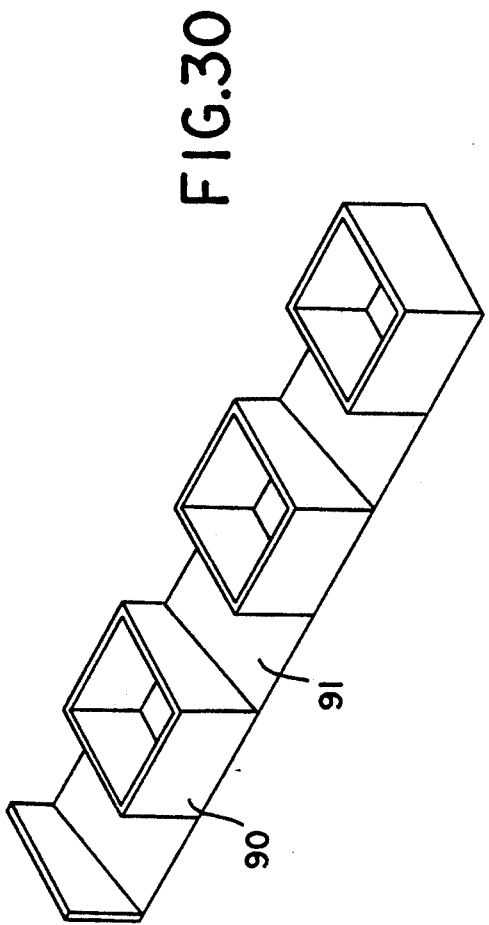
FIG. 30 shows an isometric view of a transition piece to interconnect respective channels of adjacent but orthogonally arranged panels according to FIG. 26.

FIG. 30 shows a transition piece which enables one area of floor which is laid with upper ducts running In one direction to be connected with another section of floor in which the upper ducts run at right-angles. It is laid in a line along the junction of the two areas, and in the orientation shown in FIG. 30, the lower edge of the sloping trays (91) fits against the lower ducts (61), (62), (63) of the floor panel. It can, however, be mounted upside-down to create a joint-line along the adjacent face of the panels.

I claim:

1. A modular panel, which in use is laid in an extended array over a supporting sub-surface to form a hollow floor, wall or ceiling suitable for reticulating electrical, optio-fibre, hydraulic or other conduit, and which comprises an upper load bearing deck which overlies structural support elements which form an interstitial duct zone between the deck and a supporting sub-surface, wherein the elements define a lower duct zone which is partitioned by lateral ribs to form a set of lateral ducts running from one side of the panel to another, an upper duct zone which is partitioned by longitudinal ribs to form a set of longitudinal ducts running from one end of the panel to another, said longitudinal ducts having an imperforate lower surface, and said modular panel also includes a set of vertical ducts adjacent to said imperforate lower surface of said longitudinal ducts which open onto the lower, lateral, ducts and into the upper, longitudinal ducts, wherein each of the lateral, longitudinal, and vertical duct sets is composed of two or more sub-sets of ducts and only corresponding ones of each sub-set of the lateral, longitudinal and vertical ducts are in communication, each of the lower, lateral, ducts being in communication with an upper, longitudinal, duct of a corresponding sub-set through a vertical duct of that corresponding sub-set.

2. A modular panel as claimed in claim 1, wherein each vertical duct communicates with the corresponding upper, longitudinal duct through a laterally opening knock-out panel.

3. A modular panel as claimed in claim 1, wherein the deck is removably attached to structural support elements by wedging devices formed integrally with the structural support elements.

4. A modular panel as claimed in claim 1, wherein a plurality of thickened ribs are formed between the ducts, forming structural pillars which in use transfer load from the deck to the supporting sub-surface.

5. A modular panel as claimed in claim 1, wherein a plurality of twin-rib constructions are formed between the ducts, forming structural pillars which in use transfer load from the deck to the supporting sub-surface.

6. A modular panel as claimed in claim 1, wherein a tray is provided between the structural support elements and the sub-surface, the tray having vertical ribs which engage with the lower, lateral ribs of the structural support elements, and which in use accommodates undulations in the supporting sub-surface.

7. A modular panel as claimed in claim 1 wherein interlocking keys are provided in the sides and ends of the modular panel so that in use incorrect orientation of abutting panels is prevented and vertical mis-alignment is reduced.

* * * * *